(12) United States Patent
Zhao et al.

(10) Patent No.: US 12,377,716 B2
(45) Date of Patent: Aug. 5, 2025

(54) SEMI-AUTOMATIC TELESCOPIC AUTOMOBILE AIR CONDITIONER AIR OUTLET

(71) Applicant: SAIC GM Wuling Automobile CO., Ltd, Liuzhou (CN)

(72) Inventors: Xiaobin Zhao, Liuzhou (CN); Zuomei Liu, Liuzhou (CN); Changye Liu, Liuzhou (CN); Xuejun Wei, Liuzhou (CN); Wei Shen, Liuzhou (CN); Wei Li, Liuzhou (CN)

(73) Assignee: SAIC GM Wuling Automobile CO., Ltd, Liuzhou (CN)

( * ) Notice: Subject to any disclaimer, the term of this patent is extended or adjusted under 35 U.S.C. 154(b) by 374 days.

(21) Appl. No.: 18/189,960

(22) Filed: Mar. 24, 2023

(65) Prior Publication Data

US 2023/0339294 A1  Oct. 26, 2023

(30) Foreign Application Priority Data

Apr. 21, 2022 (CN) .......................... 202210422684.9

(51) Int. Cl.
   *B60H 1/34* (2006.01)
(52) U.S. Cl.
   CPC ... *B60H 1/3414* (2013.01); *B60H 2001/3471* (2013.01)
(58) Field of Classification Search
   CPC .. B60H 1/3414; B60H 1/3435; B60H 1/0025; B60H 1/00264; B60H 1/00295; B60H 1/00592; B60H 2001/3471; B60H 2001/3492; F26B 21/004; B64D 2013/003
   See application file for complete search history.

(56) References Cited

U.S. PATENT DOCUMENTS

| | | | | |
|---|---|---|---|---|
| 1,020,347 | A * | 3/1912 | Follett | B65D 21/086 220/8 |
| 6,669,552 | B1 * | 12/2003 | Beer | E21F 1/04 454/903 |
| 2014/0222020 | A1 * | 8/2014 | Bender | A61B 17/00234 606/130 |
| 2019/0241046 | A1 * | 8/2019 | Chiu | B60H 1/3428 |

FOREIGN PATENT DOCUMENTS

| | | |
|---|---|---|
| CN | 207902101 U | 9/2018 |
| CN | 208826965 U | 5/2019 |
| CN | 215921829 U | 3/2022 |

* cited by examiner

*Primary Examiner* — Steven S Anderson, II
(74) *Attorney, Agent, or Firm* — Nitin Kaushik

(57) ABSTRACT

The invention relates to the technical field of automobile accessories, and discloses a semi-automatic telescopic automobile air conditioner air outlet, comprising an instrument panel body, and further comprising an adjustment mechanism and a damper assembly; the adjustment mechanism is provided on the instrument panel body, one end thereof is in communication with the automobile air conditioner air outlet, and the other end thereof may adjust the distance along a straight line and selectively lock the adjustment position thereof, for guiding the wind direction of the automobile air conditioner and adjusting the distance between the air outlet thereof and the instrument panel body; and the damper assembly is provided at one end of the adjustment mechanism away from the automobile air conditioner air outlet, for performing secondary adjustment and guiding on the wind direction of the adjustment mechanism.

9 Claims, 8 Drawing Sheets

SEMI-AUTOMATIC TELESCOPIC AUTOMOBILE AIR CONDITIONER AIR OUTLET

CROSS-REFERENCE TO RELATED APPLICATIONS

The application claims priority to Chinese patent application No. 2022104226849, filed on Apr. 21, 2022, the entire contents of which are incorporated herein by reference.

TECHNICAL FIELD

The invention relates to the technical field of automobile accessories, and particularly to a semi-automatic telescopic automobile air conditioner air outlet.

BACKGROUND

The automobile air conditioner air outlet is also called an air window on the automobile, and the air window assembly is an important functional part of the instrument panel system, which has the function of adjusting the wind direction to meet the demand of passengers, and also has a certain decorative function; an automobile air conditioner air outlet is generally composed of a blade, a connecting rod, a housing and a shifting plate, etc., a rotating shaft is provided on the blade, and the structure of the rotating shaft is cylindrical. Each blade is arranged in parallel and connected with the connecting rod and the housing, and when the blade is toggled, the remaining blades swing with the main blade under the action of the connecting rod, and play the role of adjusting the wind direction and blowing to various parts of the human body.

The existing automobile air conditioner air outlet is generally of a fixed structure, which is not convenient for telescopic adjustment of the distance and angle between the air outlet and the passenger. Some adjustable automobile air conditioner air outlets use bellows for telescopic adjustment, however, the passenger needs to be hand-held and positioned during its use, resulting in inconvenience of use, so a telescopic automobile air conditioner air outlet is proposed to solve the above-mentioned problems.

SUMMARY

(I) Technical Problem to be Solved

In view of the deficiencies of the prior art, the invention provides a semi-automatic telescopic automobile air conditioner air outlet, which has the advantages of facilitating high-precision adjustment of the distance and angle and automatic limiting, etc. and solves the problem that the existing automobile air conditioner air outlet is generally of a fixed structure, which is not convenient for telescopic adjustment of the distance and angle between the air outlet and passengers, and some adjustable automobile air conditioner air outlets use bellows for telescopic adjustment, however, the passenger needs to be hand-held and positioned during its use, resulting in inconvenience of use.

(II) Technical Solution

In order to achieve the above-mentioned object of facilitating high-precision adjustment of the distance and angle and automatic limiting, the invention provides the following technical solution; a semi-automatic telescopic automobile air conditioner air outlet, comprising an instrument panel body, and further comprising an adjustment mechanism and a damper assembly;

An adjustment mechanism is provided on the instrument panel body, one end thereof is in communication with the automobile air conditioner air outlet, and the other end thereof may adjust the distance along a straight line and selectively lock the adjustment position thereof, for guiding the wind direction of the automobile air conditioner and adjusting the distance between the air outlet thereof and the instrument panel body;

A damper assembly is provided at one end of the adjustment mechanism away from the automobile air conditioner air outlet, for performing secondary adjustment and guiding on the wind direction of the adjustment mechanism.

Preferably, the adjustment mechanism comprises a base, a telescopic assembly, a top seat and a first spring; the base is provided on the instrument panel body and is in communication with the automobile air conditioner air outlet; the telescopic assembly is sheathed on the base and selectively rotated and telescopically adjusted along the axial direction thereof for guiding the wind direction of the base and adjusting the distance and angle between the top base and the base; the top seat is sheathed on the telescopic assembly, and one end thereof away from the base is provided with a damper assembly; one end of the first spring is clamped with the base and the other end is clamped with the top base, for applying an axial tensile force and a radial torque to the telescopic assembly.

Preferably, the telescopic assembly comprises several air ducts, a first positioning hole and a first positioning pin; the inner diameters of several air ducts are successively increased and are coaxially nested; the air duct is provided with a first positioning hole, and the base is provided with a second positioning pin clamped with the first positioning hole; the air duct is provided with a first positioning pin, two adjacent air ducts are clamped with the first positioning hole via the first positioning pin, and the top seat is provided with a second positioning hole adapted to the first positioning pin.

Preferably, each air duct is provided with a number of no less than three first positioning pins, and a plurality of first positioning pins are distributed in a circular array on the air duct with the center line thereof as an axis.

Preferably, the first positioning pin comprises a positioning post and a positioning block; the positioning post is provided on the outer cylindrical surface of the air duct; the positioning block is provided on one side of the positioning post away from the axis of the air duct, and the first positioning hole and the second positioning hole are both countersunk holes.

Preferably, the damper assembly comprises an end cover, an elastic component, and a fan blade; the end cover is rotated in an axial direction and provided on the top seat; an elastic component is provided on the top seat and abuts against the end cover for detachably connecting the end cover and the top seat; and the fan blade is provided on the end cover.

Preferably, the elastic component comprises a first limiting portion, an elastic arm, a second limiting portion and a third limiting portion; the number of the elastic arms and the second limiting portions is not less than three, and the elastic arms and the second limiting portions are successively provided at intervals and are connected end to end, and two ends thereof are respectively connected to the first limiting portion and the third limiting portion to form an arc-shaped structure; the first limiting portion is clamped to the outer wall of the top seat, and the top seat is provided with a first protrusion adapted to the first limiting portion; the second limiting portion penetrates and extends into the top seat and is clamped with the end cover, and the end cover is provided with a clamping groove adapted to the second limiting portion; the third limiting portion is clamped to the outer wall of the top seat, and the top seat is provided with a second protrusion adapted to the third limiting portion.

Preferably, the second limiting portions are distributed in a circular array with the axis of the top seat as a center line.

Preferably, the damper assembly further comprises a positioning assembly, and the positioning assembly is provided on the top seat and abuts against the end cover for limiting the relative rotation angle between the end cover and the top seat.

Preferably, the positioning assembly comprises a second spring and a limiting protrusion; the second spring is provided on the top seat, and the top seat is provided with a mounting hole adapted to the second spring; the limiting protrusion is provided at one end of the second spring and abuts against the end cover, and the end cover is provided with a positioning groove adapted to the limiting protrusion.

(III) Advantageous Effects

Compared with the prior art, the invention provides a semi-automatic telescopic automobile air conditioner air outlet with the following advantageous effects:
1. The distance between the damper assembly and the instrument panel body is preliminarily adjusted along a straight line by the adjustment mechanism and the adjustment position thereof is locked, so the users' hands are liberated, and then the wind direction angle of the automobile air conditioner air outlet is secondarily adjusted by the damper assembly, so as to achieve the effect of simple, convenient and high-precision adjustment;
2. The base, the telescopic assembly and the top seat on the adjustment mechanism are telescoped and rotated along an axial direction, and an axial tensile force and a radial torque are applied thereto by the first spring, so that the automobile air conditioner air outlet has the effects of automatically resetting and selectively limiting;
3. The air duct on the telescopic assembly is adjusted in cooperation with the first positioning hole, the first positioning pin, the second positioning pin and the second positioning hole, so that the first spring drives the base and the top seat to adjust and limit several air ducts at different telescopic distances and angles;
4. The positioning post and the positioning block on the first positioning pin cooperate with the first positioning hole and the second positioning hole to slide relative to each other, and the first positioning hole and the second positioning hole are both countersunk J-shaped holes, thereby enabling the air duct to facilitate limiting, and at the same time, preventing the air duct from falling off due to poor connection stability and affecting the wind direction accuracy of the automobile air conditioner air outlet;
5. The end cover and the fan blade on the damper assembly are rotated, thereby facilitating further adjustment of the wind direction angle at the automobile air conditioner air outlet; and the first limiting portion, the elastic arm, the second limiting portion and the third limiting portion on the elastic component are used in cooperation, thereby facilitating the installation, disassembly and replacement of the top seat, the end cover and the fan blade; and finally, the second spring of the positioning assembly drives the limiting protrusion to abut against the positioning groove on the end cover and limits the angle between the end cover and the top seat, so as to achieve the effect of simple, convenient and multi-stage high-precision adjustment of the wind direction.

DETAILED DESCRIPTION OF THE EMBODIMENTS

The technical solution of the embodiments of the invention will be clearly and completely described below with reference to the drawings of the embodiments of the invention. Apparently, the described embodiments are merely certain embodiments of the invention, rather than all of the embodiments. All of the other embodiments that a person skilled in the art obtains on the basis of the embodiments of the invention without paying creative work fall within the protection scope of the invention.

Figure 1:
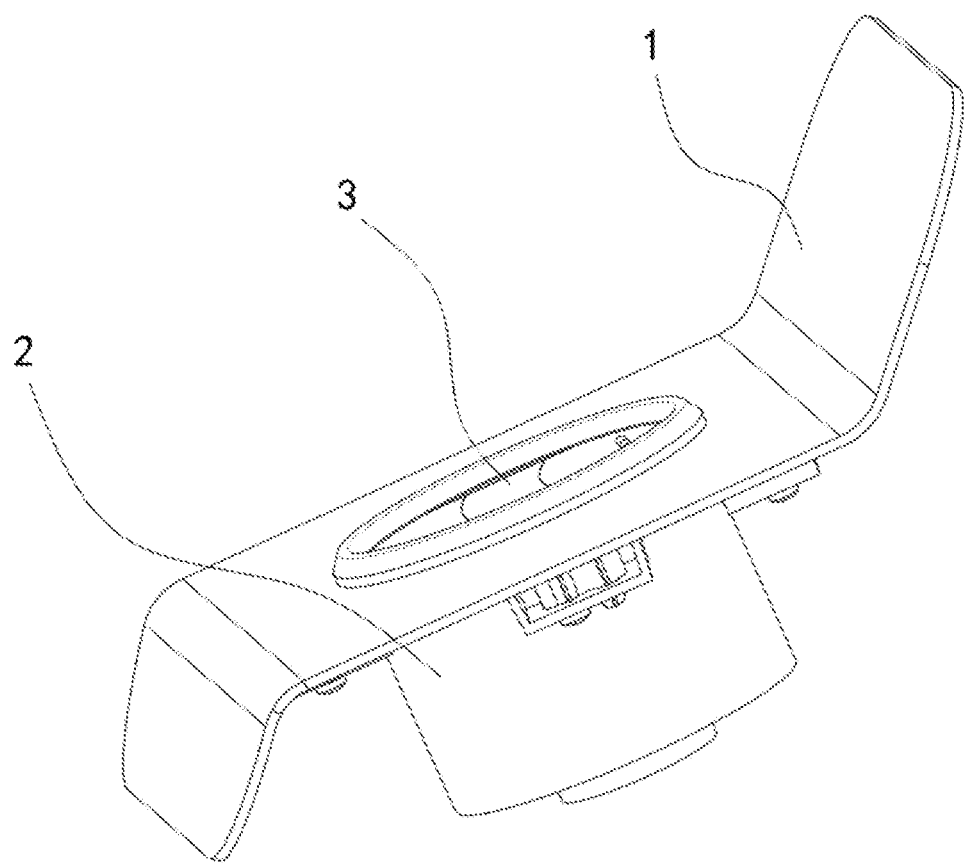
FIG. 1 is a stereogram view of a structure of the invention in a closed state.

With reference to FIG. 1, a semi-automatic telescopic automobile air conditioner air outlet comprises an instrument panel body 1, and further comprises an adjustment mechanism 2 and a damper assembly 3. The adjustment mechanism 2 is fixedly connected to the instrument panel body 1 via a screw, and one end of the adjustment mechanism 2 is in communication with the automobile air conditioner air outlet, and the other end may adjust an angle and a distance along a straight line and selectively lock an adjustment position thereof; the adjustment mechanism 2 is used for guiding the wind direction of the automobile air conditioner and adjusting the distance between the air outlet thereof and the instrument panel body 1; and the damper assembly 3 is movably mounted at one end of the adjustment mechanism 2 away from the automobile air conditioner air outlet; the damper assembly 3 is used for performing secondary adjustment and guiding on the wind direction of the adjustment mechanism 2; the distance and angle between the damper assembly 3 and the instrument panel body 1 are preliminarily adjusted and the adjustment position thereof is selectively locked and limited by the adjustment mechanism 2, and at the same time, the wind direction of the automobile air conditioner air outlet is guided by the adjustment mechanism 2, and then the wind direction of the air outlet of the adjustment mechanism 2 is secondarily adjusted and guided by the damper assembly 3, so that the automobile air conditioner air outlet is convenient for adjusting the distance and wind direction angle between the air outlet and the passenger and selectively limiting the same, and then the passengers' hands are liberated, and the distance, angle and limit may be adjusted easily and accurately.

Figure 2:
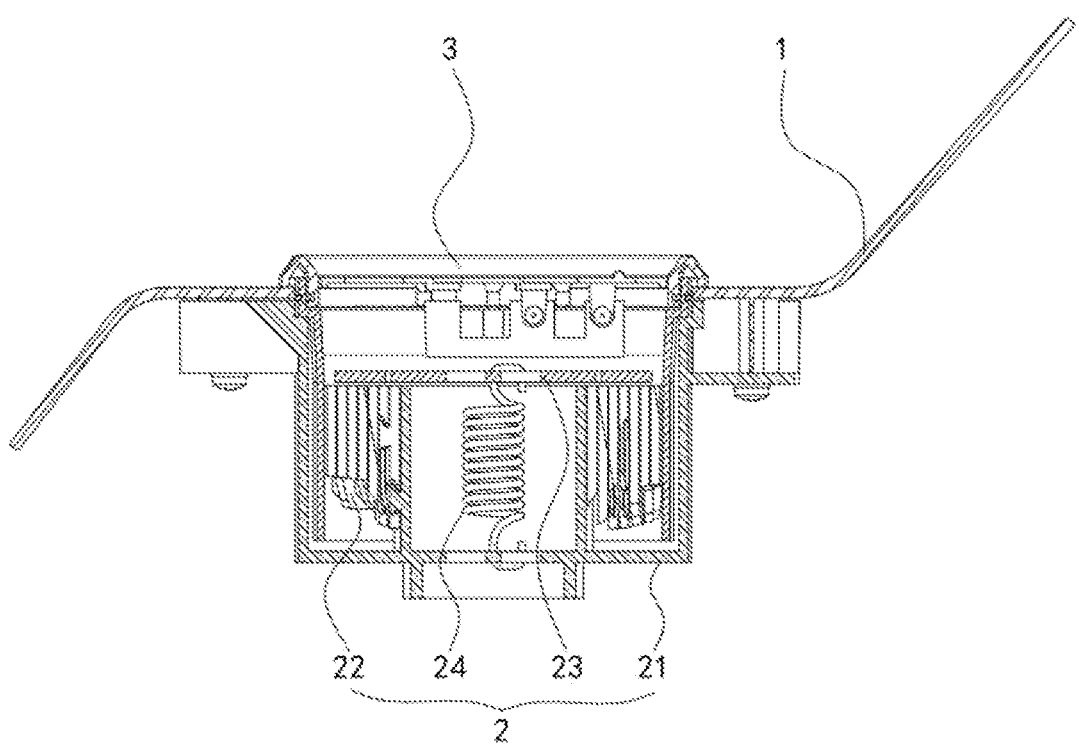
FIG. 2 is a front sectional view of a structure of the invention in a closed state.

In order to further improve the accuracy of adjusting the wind direction of the automobile air conditioner air outlet, specifically, the adjustment mechanism 2 comprises a base 21, a telescopic assembly 22, a top seat 23 and a first spring 24. As shown in FIG. 2, the base 21 is fixedly connected to the instrument panel body 1 via a screw, and one end of the base 21 is in communication with the automobile air conditioner air outlet; the telescopic assembly 22 is sheathed on the base 21 and selectively rotated and telescopically adjusted along the axial direction thereof for guiding the wind direction of the base 21 and adjusting the distance and angle between the top seat 23 and the base 21; and the top seat 23 is sheathed on the telescopic assembly 22, and one end thereof away from the base 21 is movably connected to the damper assembly 3, one end of the first spring 24 is clamped with the base 21, and the other end is clamped with the top seat 23, the base 21 and the top seat 23 are respectively provided with a through hole adapted to the first spring 24, and the first spring 24 is used for elastically connecting the base 21 and the top seat 23 and applying an axial tensile force and a radial torque to the telescopic assembly 22. The distance and angle between the damper assembly 3 and the automobile air conditioner air outlet are adjusted by the telescopic assembly 22 cooperating with the base 21 and the top seat 23, and the base 21 and the top seat 23 are driven to apply an axial compression force and a radial torque to the telescopic assembly 22 by the elastic expansion and contraction of the first spring 24, so as to avoid the situation that the limit accuracy of the telescopic assembly 22 is poor and affects the wind direction adjustment accuracy of the automobile air conditioner air outlet.

Figure 3:
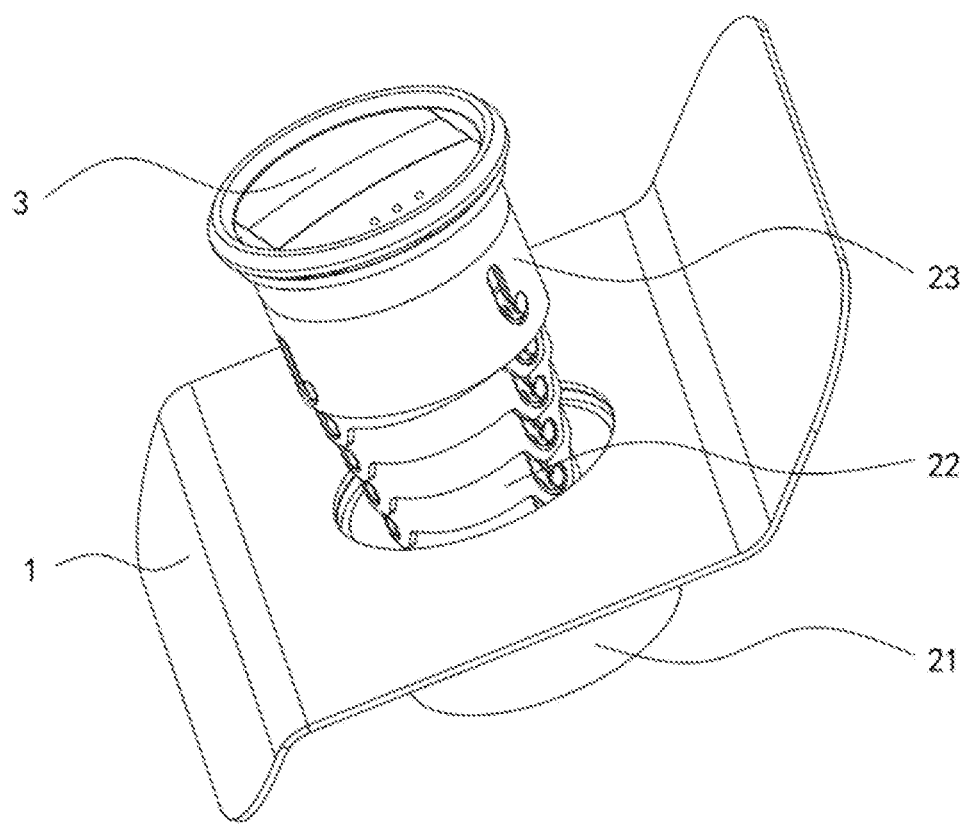
FIG. 3 is a stereogram view of a structure of the invention in a stretched state.
Figure 4:
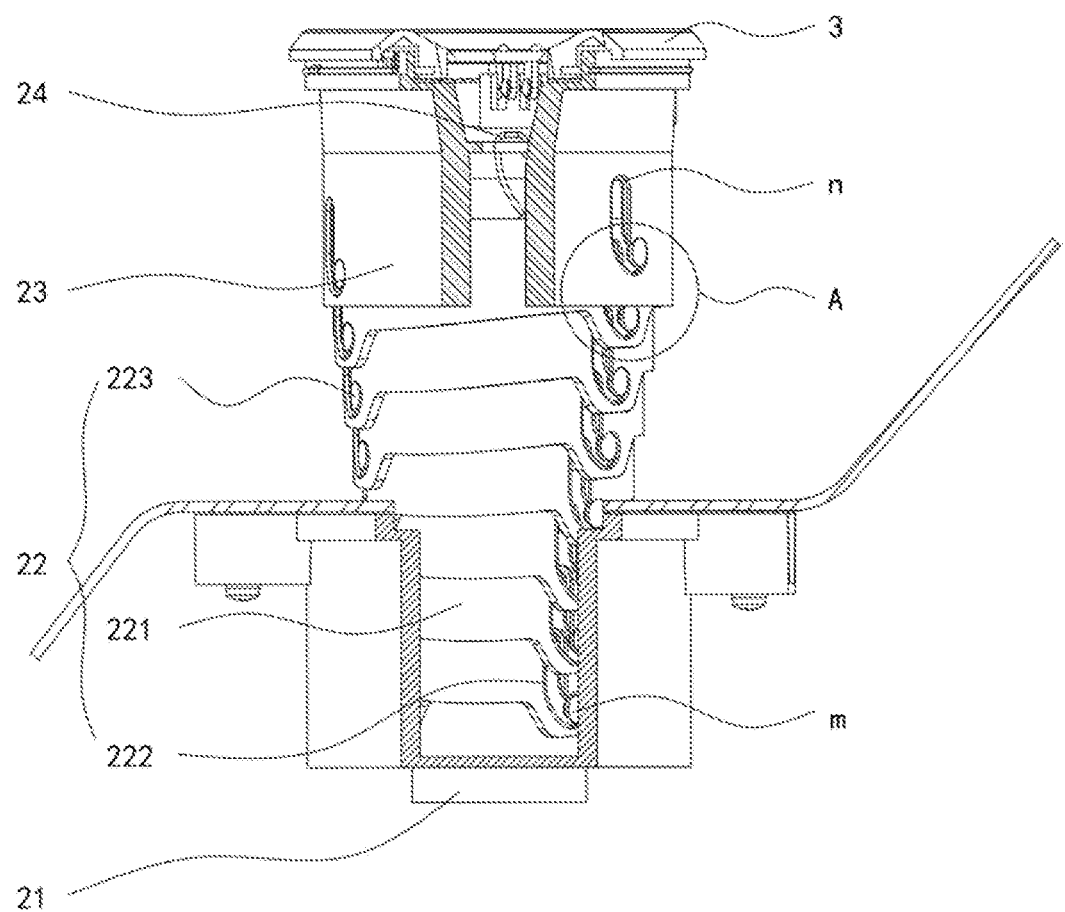
FIG. 4 is a front sectional view of a structure of the invention in a stretched state.

In order to further improve the accuracy of adjusting the wind direction of the automobile air conditioner air outlet, specifically, the telescopic assembly 22 comprises several air ducts 221, a first positioning hole 222 and a first positioning pin 223. As shown in FIG. 3 and FIG. 4, the inner diameters of several air ducts 221 are successively increased and are coaxially nested, the air duct 221 is provided with a first positioning hole 222, and the base 21 is fixedly mounted with a second positioning pin m clamped with the first positioning hole 222, the air duct 221 is fixedly mounted with a first positioning pin 223, two adjacent air ducts 221 are movably connected with the first positioning hole 222 via the first positioning pin 223, and the top seat 23 is provided with a second positioning hole n adapted to the first positioning pin 223. The axial stretching distance and the axial rotation angle between several air ducts 221 are limited via a first positioning hole 222 and a first positioning pin 223 on the air duct 221, and at the same time, a second positioning pin m on the base 21 and a second positioning hole n on the top seat 23 cooperate with the first positioning hole 222 and the first positioning pin 223 on the air duct 221 to limit the axial stretching distance and the axial rotation angle between the base 21 and the top seat 23; thus, the automobile air conditioner air outlet may selectively adjust the axial stretching distance and the axial rotation angle between any of the air duct 221 and the base 21 and the top seat 23 during the adjustment process, so as to adjust the different angles and stretching distances between the top seat 23 and the damper assembly 3 and the base 21 with high precision in cooperation with the first spring 24.

In the above-mentioned embodiments of the present technical solution, the inner diameters of several air ducts 221 are successively increased and are coaxially nested, or the inner diameters of several air ducts 221 are successively decreased and are coaxially nested, as long as it is ensured that the several air ducts 221 may be axially telescoped and rotatably adjusted.

In order to further improve the accuracy of adjusting the wind direction of the automobile air conditioner air outlet, specifically, the number of the first positioning holes 222 and the first positioning pins 223 on each air duct 221 is not less than three, and the first positioning holes 222 and the first positioning pins 223 are distributed in a circular array on the air duct 221 with the axis of the air duct 221 as a center line; each air duct 221 is provided with no less than three first positioning holes 222 and first positioning pins 223, and the first positioning holes 222 and the first positioning pins 223 are distributed in a circular array on the air duct 221, the connection stress of two adjacent air ducts 221 is made more uniform, so as to avoid the situation that the uneven stress in the telescopic adjustment process of several air ducts 221 causes falling off and affects the wind direction adjustment accuracy of the automobile air conditioner air outlet.

Figure 5:
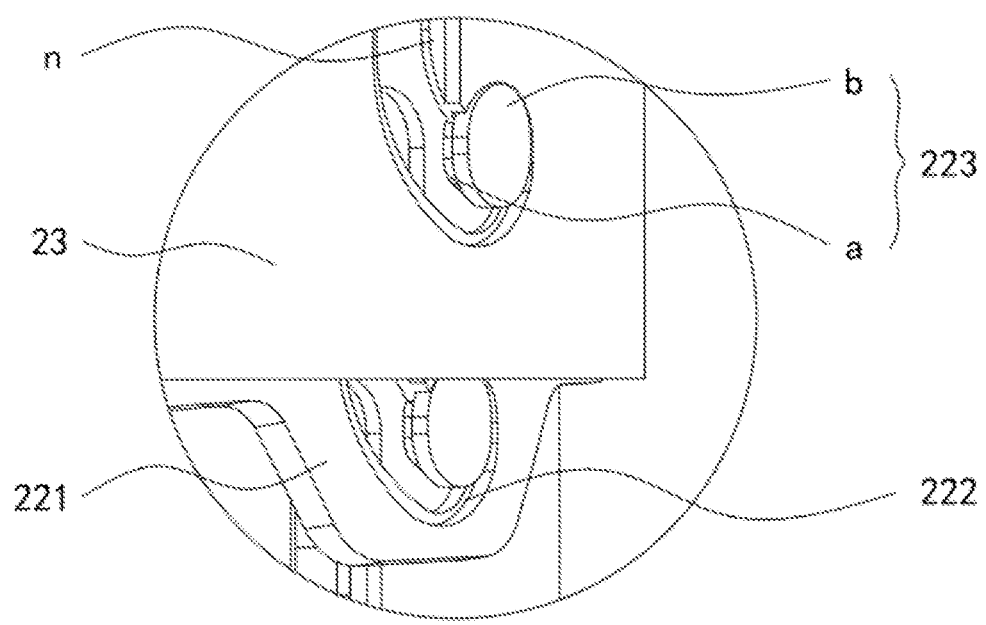
FIG. 5 is an enlarged view at A in FIG. 4.

In order to further improve the accuracy of adjusting the wind direction of the automobile air conditioner air outlet, specifically, the first positioning pin 223 comprises a positioning post a and a positioning block b. As shown in FIG. 5, the positioning post a is fixedly mounted on the outer cylindrical surface of the air duct 221, the positioning block b is fixedly mounted on one side of the positioning post a away from the axis of the air duct 221, and the first positioning hole 222 and the second positioning hole n are both countersunk J-shaped holes. The positioning posts a of the plurality of first positioning pins 223 on the air duct 221 are respectively slidingly clamped with the first positioning holes 222 on the adjacent air duct 221, and then the positioning block b on one side of the positioning posts a away from the axis of the air duct 221 is slidingly limited with the first positioning holes 222 so as to avoid the situation that the deflection occurs during the telescopic adjustment process of the two adjacent air ducts 221 and affects the wind direction adjustment accuracy of the automobile air conditioner air outlet; and then the first positioning holes 222 and the second positioning holes n are both countersunk J-shaped holes for selectively rotating and adjusting any of the air ducts 221 during the adjustment process, thus, the axial distance between the several air ducts 221 is adjusted at a fixed distance, and then the axial distance between the fixed distance damper assembly 3 and the base 21 is adjusted, and the bent end of the J-shaped hole of the first positioning hole 222 on the air duct 221 is preliminarily limited to the first positioning pin 223, and the axial force and the radial rotation torque applied thereto by the first spring 24 are used to avoid the occurrence of non-directional axial rotation or expansion during the adjustment between the several air ducts 221, thus affecting the wind direction adjustment accuracy of the automobile air conditioner air outlet.

In the above-mentioned embodiments of the present technical solution, the positioning post a is provided on the outer cylindrical surface of the air duct 221, and the positioning post a may also be provided on the inner cylindrical surface of the air duct 221, as long as it is ensured that two adjacent air ducts 221 may stably rotate and telescope relative to each other in an axial direction.

Figure 6:
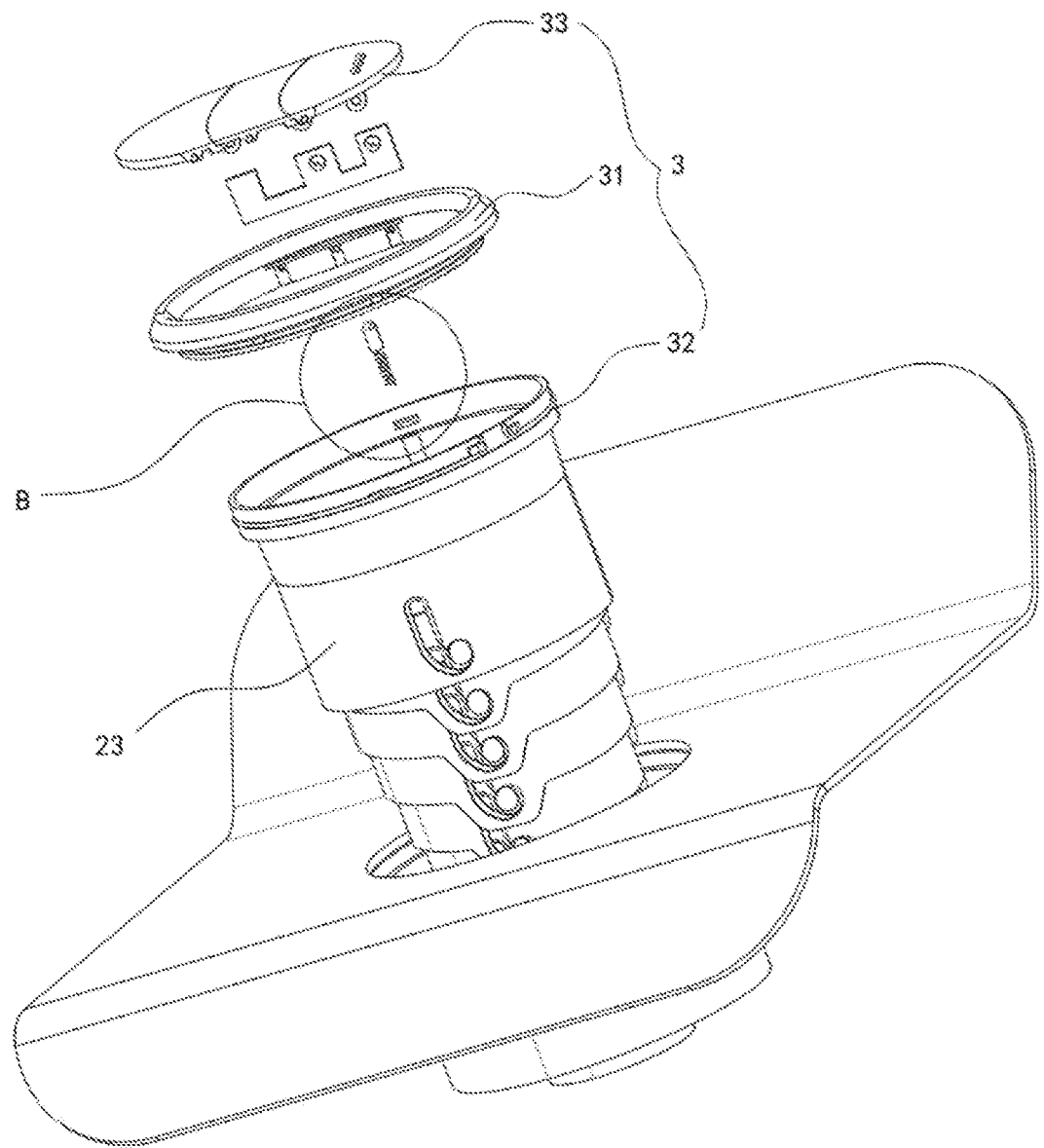
FIG. 6 is an exploded view of a structure of the invention in a stretched state.

In order to further improve the accuracy of adjusting the wind direction of the automobile air conditioner air outlet, specifically, the damper assembly 3 comprises an end cover 31, an elastic component 32 and a fan blade 33. As shown in FIG. 6, the end cover 31 is movably mounted on one end of the top seat 23 away from the air duct 221 and may be rotated in an axial direction relative thereto, the elastic component 32 is provided on the top seat 23 and abuts against the end cover 31 for detachably connecting the end cover 31 and the top seat 23, the fan blade 33 is movably mounted on the end cover 31, the fan blade 33 comprises a baffle plate and a connecting plate, and the number of baffle plates is not less than two, and the baffle plate is rotated in an axial direction and mounted on the end cover 31 perpendicular to the air duct 221 and forms an air outlet flow guide channel with the end cover 31, and the connecting plate is hinged on the baffle plate for adjusting the synchronous linkage of the plurality of baffle plates. The angle of the end cover 31 on the top seat 23 is rotated and adjusted, it is convenient to adjust the angle of the baffle plate on the fan blade 33 and the end cover 31 to form a flow guide channel, thereby adjusting the wind direction of the damper assembly 3, and the elastic component 32 facilitates the installation, disassembly, cleaning and replacement of the end cover 31 and the top seat 23, so as to avoid the situation that the end cover 31 or the top seat 23 is locally damaged during the use of the automobile air conditioner air outlet and is inconvenient to be replaced so as to affect the wind direction adjustment accuracy of the automobile air conditioner air outlet.

Figure 7:
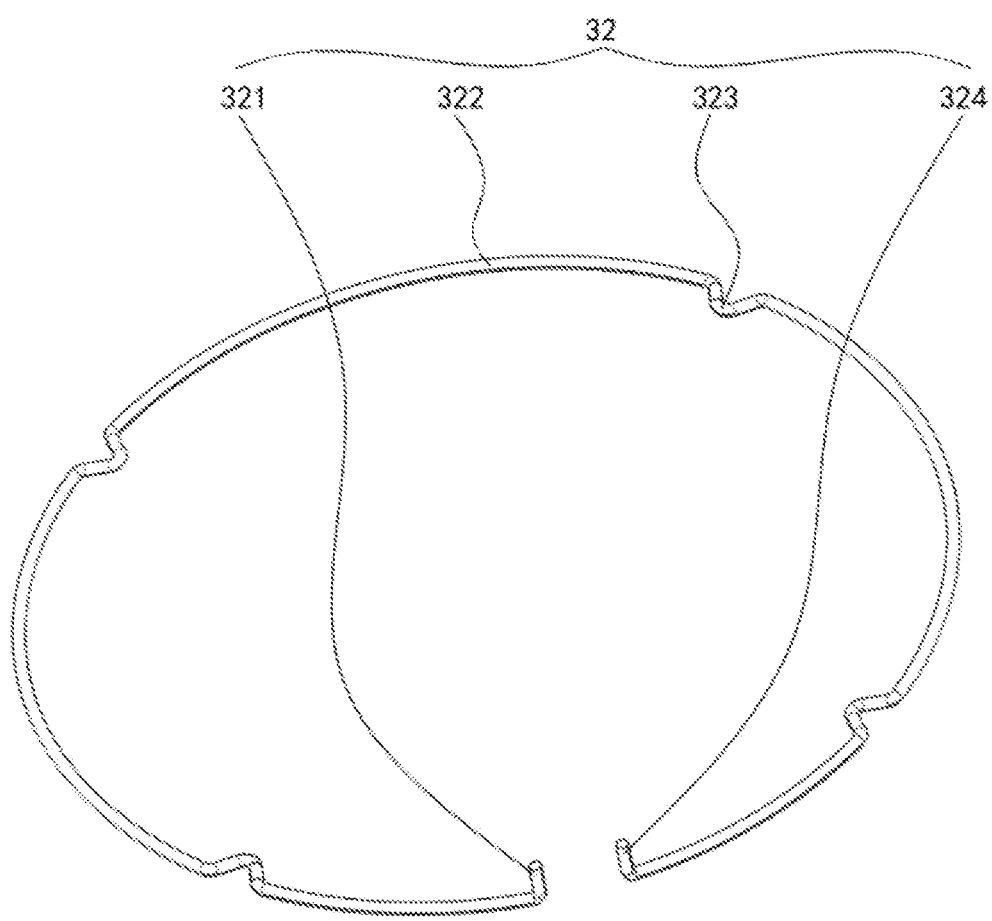
FIG. 7 is a stereogram view of a structure of an elastic component of the invention.

In order to further improve the accuracy of adjusting the wind direction of the automobile air conditioner air outlet, specifically, the elastic component 32 comprises a first limiting portion 321, an elastic arm 322, a second limiting portion 323 and a third limiting portion 324. As shown in FIG. 7, the number of the elastic arms 322 and the second limiting portions 323 is not less than three, and the elastic arms 322 and the second limiting portions 323 are successively provided at intervals and are connected end to end, and two ends thereof are respectively connected to the first limiting portion 321 and the third limiting portion 324 to form an arc-shaped structure, and the first limiting portion 321 is clamped to the outer wall of the top seat 23, and the top seat 23 is fixedly mounted with a first protrusion adapted to the first limiting portion 321, the second limiting portion 323 penetrates and extends into the top seat 23 and is clamped with the end cover 31, the end cover 31 is provided with a clamping groove adapted to the second limiting portion 323, the third limiting portion 324 is clamped to the outer wall of the top seat 23, the top seat 23 is fixedly mounted with a second protrusion adapted to the third limiting portion 324; the first limiting portion 321, the elastic arm 322, the second limiting portion 323 and the third limiting portion 324 may be integrated metal clamping springs or may be elastic plastic parts. The first limiting portion 321 and the third limiting portion 324 on the elastic component 32 are respectively preliminarily clamped with the first protrusion and the second protrusion on the top seat 23, and then the elastic arm 322 on the elastic component 32 drives the second limiting portion 323 to extend into the top seat 23 and to be clamped with the clamping groove on the end cover 31, so that the second limiting portion 323 limits the height of the top seat 23 and the end cover 31 in the axial direction and facilitates the disassembly, installation and maintenance, so as to avoid the situation that the poor installation stability between the top seat 23 and the end cover 31 affects the wind direction adjustment accuracy of the automobile air conditioner air outlet.

In order to further improve the accuracy of adjusting the wind direction of the automobile air conditioner air outlet, specifically, the second limiting portions 323 are distributed in a circular array with the axis of the top seat 23 as a center line, thus the second limiting portions 323 make the limiting force between the top seat 23 and the end cover 31 more uniform, so as to avoid the situation that the second limiting portions 323 deform to affect the wind direction adjustment accuracy of the automobile air conditioner air outlet during the adjustment process of the top seat 23 and the end cover 31 due to the uneven acting force with the second limiting part 323.

Figure 8:
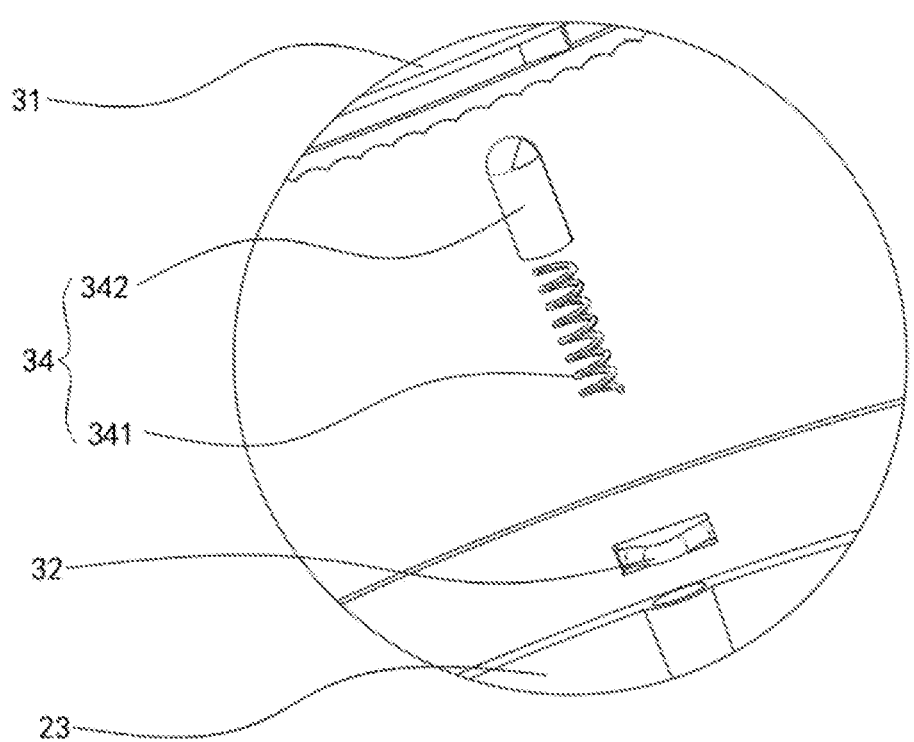
FIG. 8 is an enlarged view at B in FIG. 6.

In order to further improve the accuracy of adjusting the wind direction of the automobile air conditioner air outlet, specifically, the damper assembly 3 further comprises a positioning assembly 34. As shown in FIG. 8, the positioning assembly 34 is provided on the top seat 23 and abuts against the end cover 31 for limiting the relative rotation angle between the end cover 31 and the top seat 23. The angle between the end cover 31 and the top seat 23 is limited by the positioning assembly 34, so as to avoid the situation that the end cover 31 and the top seat 23 shake during the adjustment process and affect the wind direction accuracy of the air outlet of the damper assembly 3.

In order to further improve the accuracy of adjusting the wind direction of the automobile air conditioner air outlet, specifically, the positioning assembly 34 comprises a second spring 341 and a limiting protrusion 342. The second spring 341 is movably mounted on the top seat 23, the top seat 23 is provided with a mounting hole adapted to the second spring 341, the limiting protrusion 342 is fixedly mounted on one end of the second spring 341 and abuts against the end cover 31, the contact surface between the limiting protrusion 342 and the end cover 31 is a semi-spherical surface, and the end cover 31 is provided with a positioning groove adapted to the limiting protrusion 342; the second spring 341 drives the limiting protrusion 342 to be clamped with the positioning groove on the end cover 31, thereby limiting the end cover 31 and the top seat 23 with high precision, thereby the wind direction adjustment accuracy of the automobile air conditioner air outlet is further improved.

The working principle of the technical solution:

By stretching the end cover 31 outwards, the end cover 31 drives several air ducts 221 to expand telescopically via the top seat 23 and adjusts the distance between the end cover 31 and the base 21 and the instrument panel body 1, and at the same time, the top seat 23 drives the first spring 24 to stretch and generate elastic potential energy, and then by rotating the air duct 221 or the top seat 23, the first spring 24 rotates and generates a torque, and the bent end of the J-shaped hole of the first positioning hole 222 on the air duct 221 and the second positioning pin m are preliminarily limited; or the first positioning pin 223 on the air duct 221 and the bent end of the J-shaped hole of the first positioning hole 222 on the air duct 221 adjacent thereto are limited; or the first positioning pin 223 on the air duct 221 and the bent end of the J-shaped hole of the second positioning hole n on the top seat 23 are limited, then the first spring 24 releases the elastic potential energy and drives the top seat 23 to press several air ducts 221, thus, the distance and angle between the end cover 31 and the base 21 and the instrument panel body 1 are selectively adjusted at a fixed distance and angle, and finally, by rotating the end cover 31 and the baffle plate on the fan blade 33, the second spring 341 elastically expands and contracts and drives the limiting protrusion 342 to always abut against the positioning groove on the end cover 31 and limit the angle between the end cover 31 and the base 21, so as to achieve the effect of simple, convenient and multi-stage high-precision adjustment.

It should be noted that relational terms such as first and second, and the like, may be used herein to distinguish one entity or action from another entity or action without necessarily requiring or implying any actual such relationship or order between such entities or actions. Furthermore, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by the phrase "comprising a . . . " does not, without more constraints, preclude the existence of additional identical elements in the process, method, article, or apparatus that comprises the element.

While the embodiments of the invention have been shown and described, it will be understood by those skilled in the art that various changes, modifications, substitutions and alterations may be made herein without departing from the principles and spirit of the invention, the scope of which is defined by the appended claims and their equivalents.

What is claimed is:

1. A semi-automatic telescopic automobile air conditioner air outlet, comprising an instrument panel body, and further comprising an adjustment mechanism and a damper assembly;
   wherein the adjustment mechanism is provided on the instrument panel body, one end thereof is in communication with the automobile air conditioner air outlet, and the other end thereof may adjust a distance along a straight line and selectively lock an adjustment position thereof, for guiding a wind direction of the automobile air conditioner and adjusting the distance between the air outlet thereof and the instrument panel body; and
   the damper assembly is provided at one end of the adjustment mechanism away from the automobile air conditioner air outlet, for performing secondary adjustment and guiding on the wind direction of the adjustment mechanism; and
   wherein the adjustment mechanism comprises a base, a telescopic assembly, a top seat and a first spring;
   the base is provided on the instrument panel body and is in communication with the automobile air conditioner air outlet;
   the telescopic assembly is sheathed on the base and selectively rotated and telescopically adjusted along the axial direction thereof for guiding the wind direction of the base and adjusting the distance and angle between the top seat and the base;
   the top seat is sheathed on the telescopic assembly, and one end thereof away from the base is provided with a damper assembly; and
   one end of the first spring is clamped with the base and the other end is clamped with the top seat, for applying an axial tensile force and a radial torque to the telescopic assembly.

2. The semi-automatic telescopic automobile air conditioner air outlet according to claim 1, wherein the telescopic assembly comprises several air ducts, a first positioning hole and a first positioning pin;
   the inner diameters of several air ducts are successively increased and are coaxially nested;
   the air duct is provided with a first positioning hole, and the base is provided with a second positioning pin clamped with the first positioning hole;
   the air duct is provided with a first positioning pin, two adjacent air ducts are clamped with the first positioning hole via the first positioning pin, and the top seat is provided with a second positioning hole adapted to the first positioning pin.

3. The semi-automatic telescopic automobile air conditioner air outlet according to claim 2, wherein each air duct is provided with a number of no less than three first positioning pins, and a plurality of first positioning pins are distributed in a circular array on the air duct with a center line thereof as an axis.

4. The semi-automatic telescopic automobile air conditioner air outlet according to claim 2, wherein the first positioning pin comprises a positioning post and a positioning block;
   the positioning post is provided on the outer cylindrical surface of the air duct;
   the positioning block is provided on one side of the positioning post away from an axis of the air duct, and the first positioning hole and the second positioning hole are both countersunk J-shaped holes.

5. The semi-automatic telescopic automobile air conditioner air outlet according to claim 1, wherein the damper assembly comprises an end cover, an elastic component and a fan blade;
   the end cover is rotated in an axial direction and provided on the top seat;
   the elastic component is provided on the top seat and abuts against the end cover for detachably connecting the end cover and the top seat;
   the fan blade is provided on the end cover.

6. The semi-automatic telescopic automobile air conditioner air outlet according to claim 5, wherein the elastic component comprises a first limiting portion, an elastic arm, a second limiting portion and a third limiting portion;
   the number of the elastic arms and the second limiting portions is not less than three, and the elastic arms and the second limiting portions are successively provided at intervals and are connected end to end, and two ends thereof are respectively connected to the first limiting portion and the third limiting portion to form an arc-shaped structure;
   the first limiting portion is clamped to the outer wall of the top seat, and the top seat is provided with a first protrusion adapted to the first limiting portion;
   the second limiting portion penetrates and extends into the top seat and is clamped with the end cover, and the end cover is provided with a clamping groove adapted to the second limiting portion;
   the third limiting portion is clamped to an outer wall of the top seat, and the top seat is provided with a second protrusion adapted to the third limiting portion.

7. The semi-automatic telescopic automobile air conditioner air outlet according to claim 6, wherein the second limiting portions are distributed in a circular array with an axis of the top seat as a center line.

8. The semi-automatic telescopic automobile air conditioner air outlet according to claim 5, wherein the damper assembly further comprises a positioning assembly, and the positioning assembly is provided on the top seat and abuts against the end cover for limiting a relative rotation angle between the end cover and the top seat.

9. The semi-automatic telescopic automobile air conditioner air outlet according to claim 8, wherein the positioning assembly comprises a second spring and a limiting protrusion;
   the second spring is provided on the top seat, and the top seat is provided with a mounting hole adapted to the second spring;

the limiting protrusion is provided at one end of the second spring and abuts against the end cover, and the end cover is provided with a positioning groove adapted to the limiting protrusion.

\* \* \* \* \*